(No Model.)

J. W. COREY & L. MUTHER.
SEWING MACHINE.

No. 245,997. Patented Aug. 23, 1881.

5 Sheets—Sheet 1.

Witnesses:
C. W. Bond
A. H. Adams.

Inventors:
Jasper W. Corey
Lorenz Muther (No Model.) J. W. COREY & L. MUTHER. 5 Sheets—Sheet 2.
SEWING MACHINE.

No. 245,997. Patented Aug. 23, 1881.

Witnesses:
A. W. Bond
A. H. Adams.

Inventors:
Jasper W. Corey
Lorenz Muther

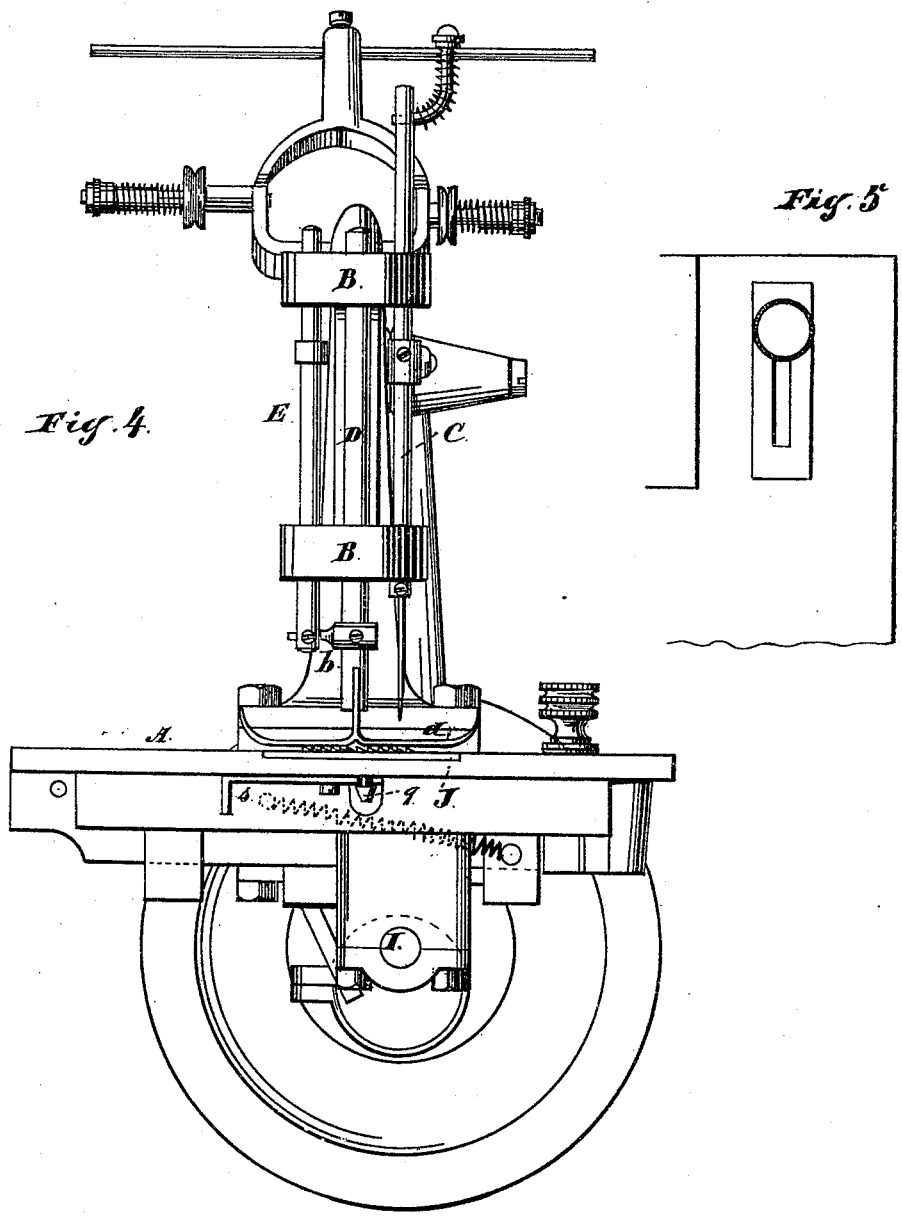

(No Model.)

J. W. COREY & L. MUTHER.

SEWING MACHINE.

No. 245,997. Patented Aug. 23, 1881.

Witnesses:
O. W. Bond
A. H. Adams

Inventors:
Jasper W. Corey
Lorenz Muther (Model.)
J. W. COREY & L. MUTHER.
SEWING MACHINE.
No. 245,997.    Patented Aug. 23, 1881.
5 Sheets—Sheet 5.
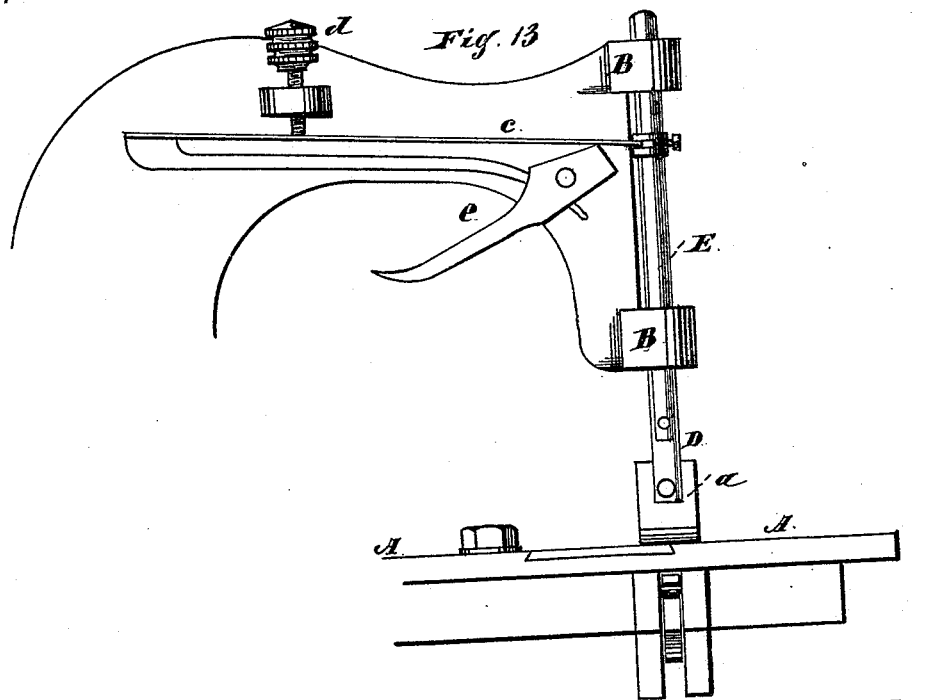
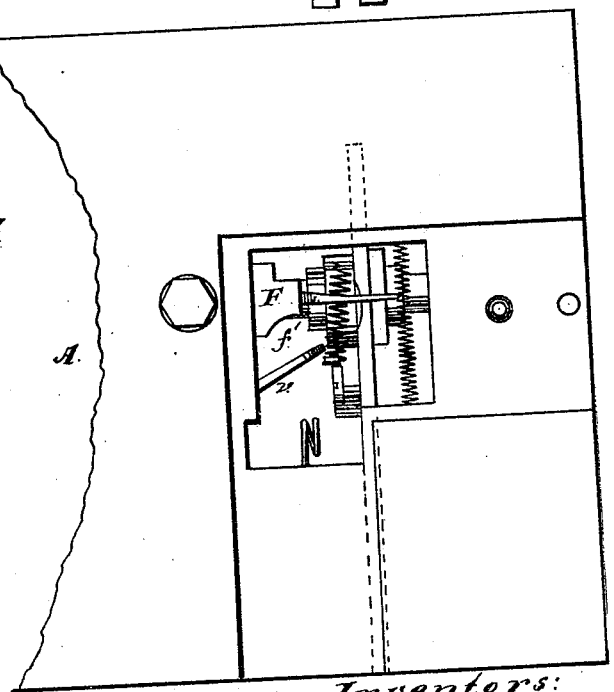
Witnesses:
O. W. Bond
A. H. Adams.
Inventors:
Jasper W. Corey
Lorenz Muther

UNITED STATES PATENT OFFICE.

JASPER W. COREY AND LORENZ MUTHER, OF CHICAGO, ILLINOIS, ASSIGNORS TO SAID MUTHER.

SEWING-MACHINE.

SPECIFICATION forming part of Letters Patent No. 245,997, dated August 23, 1881.

Application filed September 13, 1880. (No model.)

*To all whom it may concern:*

Be it known that we, JASPER W. COREY and LORENZ MUTHER, residing at Chicago, in the county of Cook and State of Illinois, and citizens of the United States, have invented a new and useful Improvement in Sewing-Machines, of which the following is a full description, reference being had to the accompanying drawings, in which—

Figure 1:
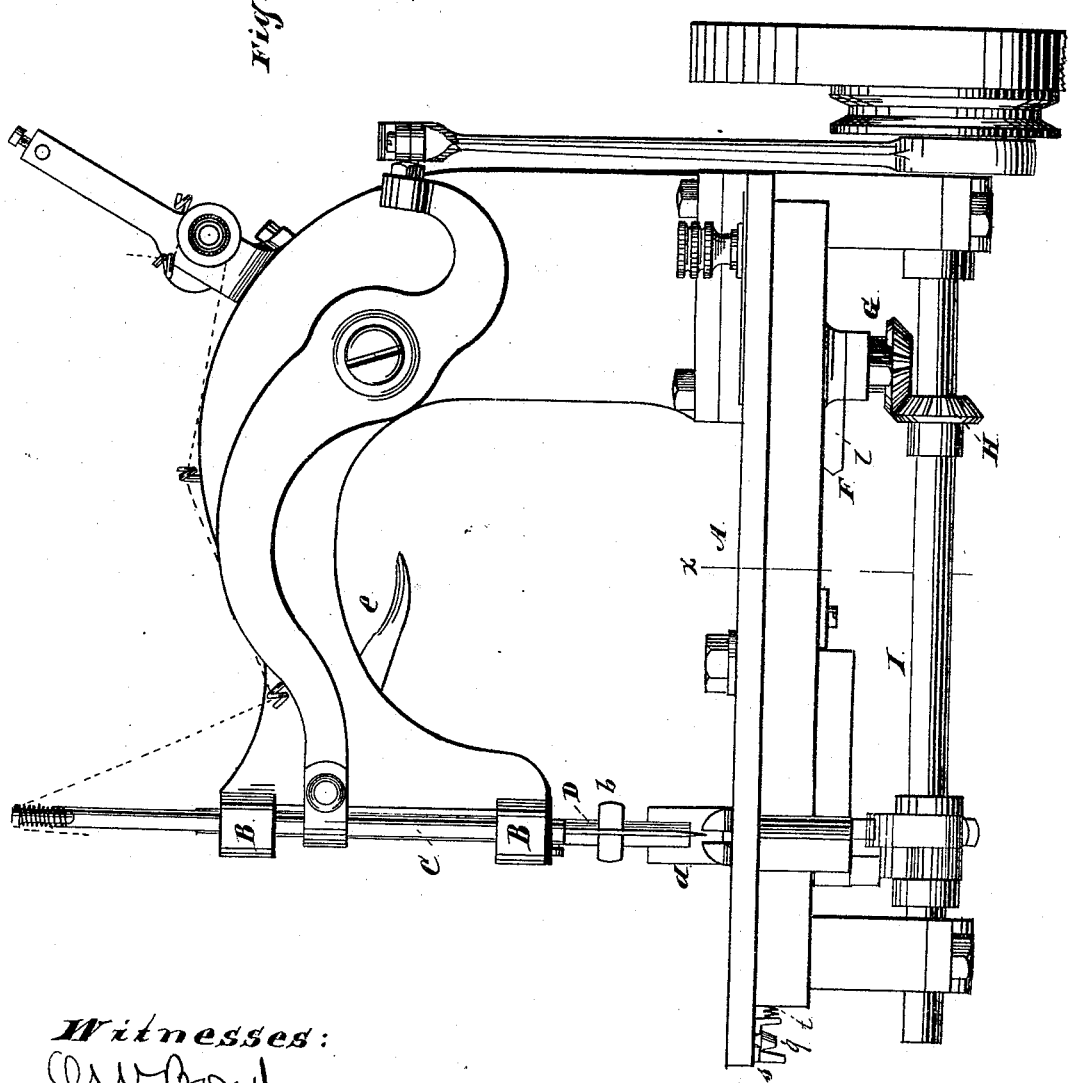
Figure 2:
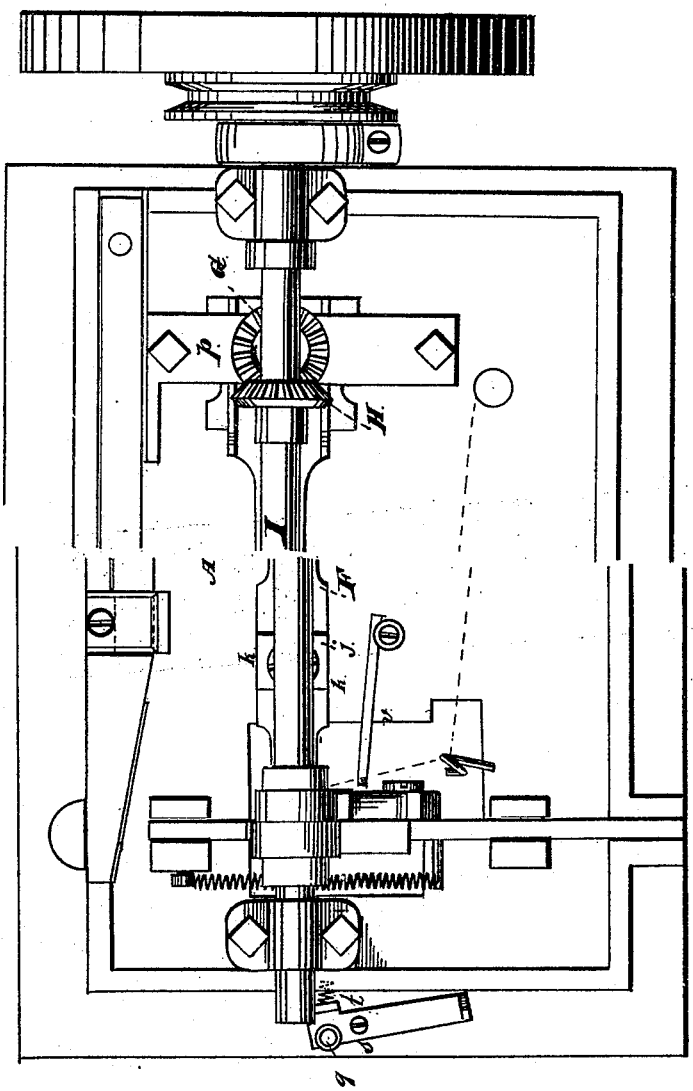
Figure 3:
Figure 6:
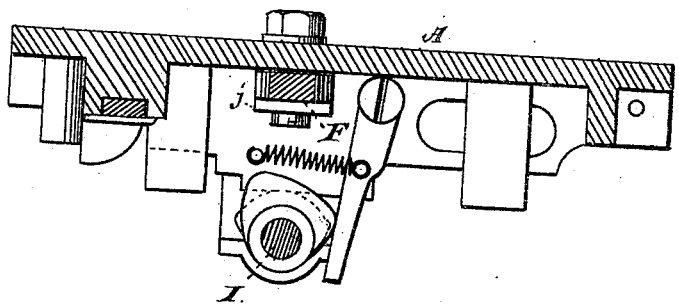
Figure 7:
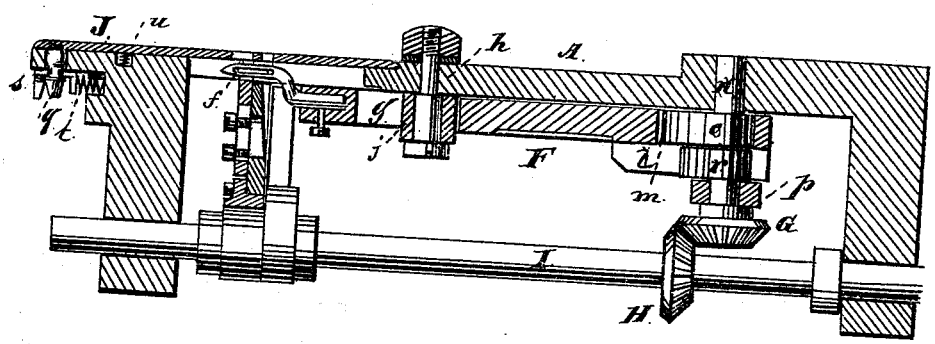
Figure 9:
Figure 8:
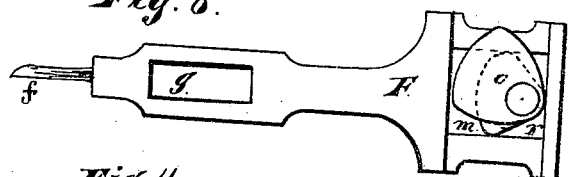
Figure 10:
Figures 11, 12:

Figure 1 is a side elevation. Fig. 2 is an under-side view. Fig. 3 is a detail, showing the under side of the lower needle-bar. Fig. 4 is an end elevation; Fig. 5, a detail. Fig. 6 is a cross-section at line $x$ of Fig. 1. Fig. 7 is a longitudinal vertical section of the principal parts shown, some parts being in elevation. Fig. 8 is a detail, being a top view of the lower needle-bar. Figs. 9, 10, 11, 12 are details. Fig. 13 is a rear elevation. Fig. 14 is a plan of the parts shown beneath the throat-plate, which is removed.

Our leading improvements are primarily designed to be applied to sewing-machines which are used in making bags, sails, awnings, tents, and similar heavy articles, and which are provided with a vertical and a horizontal needle.

The principal features consist in a double presser-bar, the two parts of which are rigidly connected together to secure strength and durability; in pivoting the under needle-bar upon an eccentric adjustable stud for the purpose of regulating the lateral movement of the lower needle; in the peculiar construction of the under needle-bar and the devices by means of which it carries its needle to opposite sides of the vertical needle.

In the drawings, A represents the bed-plate.

B is the head in which the vertical needle-bar and the presser-foot bar move.

C is the vertical needle-bar.

D is the main bar of the presser-foot, to which the presser-foot $a$ is connected. This bar moves in bearings in B.

E is a secondary bar moving in suitable bearings in the head B, and rigidly connected at its lower end with the bar D by means of a suitable device, $b$.

$c$, Fig. 13, is a spring, one end of which is connected with the presser-bar, and the other is attached to the arm which carries the head B.

$d$ is a set-screw, by means of which and the spring $c$ the pressure of the presser-foot can be adjusted.

$e$ is a lever for raising the presser-foot.

F is a bar and lever, the inner end of which carries the needle $f$, which is beneath the bed-plate.

$g$ is a slot in the bar F.

$h$ is a screw having an enlarged part, $i$, which is eccentric.

$j$ is a sleeve in the slot $g$. This sleeve $j$ has shoulder $k$.

The bar F is pivoted to the under side of the bed-plate A by means of the screw $h$ and the sleeve $j$, and is supported on the shoulders $k$ of the sleeve. The outer end of this bar F has an opening, $m$, through it, and also has downwardly-projecting flanges $l$, one on each side.

G is a bevel-wheel on the lower end of a short shaft, $n$.

$o$ and $r$ are two cams secured to the shaft $n$, $o$ being in the opening in the outer end of F and $r$ being between the flanges $l$. The cam $r$ rests on a cross-bar, $p$, and thus the wheel G and its shaft are supported. The wheel is rotated by the wheel H on the shaft I.

$v$ is a light spring beneath the bed-plate, over the free end of which the under thread passes. This spring aids in preserving the proper tension.

J is the throat-plate.

$q$ is a pin projecting downward from the throat-plate, and having a groove around it near the lower end, which is tapering.

$s$ is a spring-lever pivoted to the under side of the bed-plate, and having a hook or recess at one end to engage with the groove in the pin $q$.

$t$ is a spring which holds the lever $s$ in position when engaged with the pin $q$.

$u$ is a coil-spring located in a recess in the bed-plate, and arranged so as to press upward against the throat-plate. The throat-plate is beveled at its inner end, which, when in place, is in a suitable recess; but the sides are straight and the outer end can be lifted up.

Fig. 5 is a detail showing the device for regulating the length of the stitch. Fig. 6 shows devices for operating the feed. These parts and other parts not described are made in the usual manner.

Two needles are used in this machine, one vertical, the other horizontal, and located beneath the bed-plate. Each needle carries a thread, and the well-known Grover & Baker double chain-stitch is formed. The vertical needle is threaded and a suitable tension obtained, as usual. The under thread passes over the spring $v$, as shown in Fig. 2, and thence to the needle $f$.

In use the two bars D E, which form a double presser-bar, move together each in its own bearings. The advantages of this construction are greater strength, more bearing-surface, and greater durability, and the great strain upon the presser foot and bar is less likely to produce injury.

The vertical needle is operated as usual. The under needle has both a reciprocating movement and a lateral movement, which carries it alternately from one side to the other of the vertical needle. The reciprocating movement is given by means of the cam $o$, which rotates in the opening $m$ in the outer end of the bar F, and the lateral movement is obtained by the vibration of the bar F on the sleeve $j$, which vibration is caused by the action of the cam $r$ upon the inner faces of the flanges $l$ on the bar F. Both needles are operated by the shaft I, and the devices for operating them must be so adjusted that the needles will not in their movements interfere with each other. When a large vertical needle is used the position of the lower needle relatively to the vertical needle will not be exactly the same as when a small needle is used; and it is desirable to adjust the lower needle. We provide for this adjustment by means of the eccentric-screw $h$. By loosening the nut which holds this screw $h$ in place it can be turned, and in consequence of its eccentricity the position of the bar F can be slightly changed laterally, which change affects the lateral movement of the needle $f$, bringing it nearer to or farther from the center of the vertical needle.

The throat-plate is not inserted in place by sliding it in grooves, but by placing the inner end in position and then allowing the plate to drop nearly to place. Then by pressing down the outer end the tapering pin $q$ will pass down in the hook or recess in the lever $s$, forcing it back until the pin descends far enough to permit the lever to pass into the groove in the pin, into which it will then be forced by the spring $t$, and thus the throat-plate will be secured and held in place. To remove this plate the lever can be thrown out from the groove in the pin $q$ by pressing on the opposite end of such lever, and the outer end of the plate will then be lifted by the spring $u$ and the plate can be withdrawn.

What we claim as new, and desire to secure by Letters Patent, is—

1. In a sewing-machine, the double presser-bar, consisting of the main bar D, carrying the presser-foot, the secondary bar E, and a rigid connection, $b$, between the lower end of the secondary bar and the main bar, substantially as described, for the purposes set forth.

2. The eccentric-stud $h$, in combination with a slotted needle-bar, F, substantially as and for the purpose specified.

3. The slotted needle-bar F, pivoted to the under side of the bed-plate, and provided with an opening, $m$, and flanges $l$ at its outer end, in combination with the shaft $n$ and cams $o$ and $r$ for giving to the needle-bar longitudinally-reciprocating and lateral movements, all constructed and operating substantially as specified.

JASPER W. COREY.
LORENZ MUTHER.

Witnesses:
E. A. WEST,
O. W. BOND.